(12) United States Patent
Digonnet et al.

(10) Patent No.: US 8,009,948 B2
(45) Date of Patent: Aug. 30, 2011

(54) APPARATUS AND METHODS USING HOLLOW-CORE FIBER TAPERS

(75) Inventors: Michel J. F. Digonnet, Palo Alto, CA (US); Aydogan Ozcan, Los Angeles, CA (US)

(73) Assignee: The Board of Trustees of the Leland Stanford Junior University, Palo Alto, CA (US)

( * ) Notice: Subject to any disclaimer, the term of this patent is extended or adjusted under 35 U.S.C. 154(b) by 0 days.

(21) Appl. No.: 12/777,905

(22) Filed: May 11, 2010

(65) Prior Publication Data

US 2010/0296093 A1    Nov. 25, 2010

Related U.S. Application Data

(63) Continuation of application No. 11/828,277, filed on Jul. 25, 2007, now Pat. No. 7,742,665.

(60) Provisional application No. 60/833,108, filed on Jul. 25, 2006.

(51) Int. Cl.
*G02B 6/42* (2006.01)
(52) U.S. Cl. .......................................... 385/43; 359/333
(58) Field of Classification Search .................... 385/43; 359/333
See application file for complete search history.

(56) References Cited

U.S. PATENT DOCUMENTS

| | | | |
|---|---|---|---|
| 4,449,781 A | 5/1984 | Lightstone et al. | |
| 4,946,250 A | 8/1990 | Gonthier et al. | |
| 5,061,857 A | 10/1991 | Thompson et al. | |
| 5,339,374 A | 8/1994 | Murphy et al. | |
| 5,340,715 A | 8/1994 | Slovacek et al. | |
| 5,420,948 A | 5/1995 | Byron | |
| 5,473,714 A | 12/1995 | Vengsarkar | |
| 5,579,429 A | 11/1996 | Naum | |
| 5,638,473 A | 6/1997 | Byron | |
| 5,661,839 A | 8/1997 | Whitehead | |
| 5,673,354 A | 9/1997 | Akasaka et al. | |
| 5,708,740 A | 1/1998 | Cullen | |
| 5,818,987 A | 10/1998 | Bakhti et al. | |
| 6,148,129 A | 11/2000 | Pan et al. | |
| 6,151,155 A | 11/2000 | Durfee et al. | |
| 6,266,462 B1 | 7/2001 | Kim et al. | |

(Continued)

FOREIGN PATENT DOCUMENTS

WO   WO 2007/068244   6/2007

OTHER PUBLICATIONS

Bauer, et al. "Molding light flow from photonic band gap circuits to microstructured fibers," Applied Physics Letters, Jun. 26, 2007, vol. 90, No. 26, pp. 261111-1-261111-3.

(Continued)

*Primary Examiner* — Charlie Peng
*Assistant Examiner* — Peter Radkowski
(74) *Attorney, Agent, or Firm* — Knobbe, Martens, Olson & Bear LLP

(57) ABSTRACT

An optical device and methods of using an optical device are provided. The optical device includes a hollow-core fiber including a first portion and a second portion. The first portion includes a hollow core having a first diameter. The second portion includes a hollow core having a second diameter smaller than the first diameter. The difference between the first diameter and the second diameter is less than 10% of the first diameter.

20 Claims, 11 Drawing Sheets

U.S. PATENT DOCUMENTS

| | | |
|---|---|---|
| 6,282,342 B1 | 8/2001 | Berkey et al. |
| 6,301,418 B1 | 10/2001 | Freier et al. |
| 6,324,326 B1 | 11/2001 | Dejneka et al. |
| 6,362,916 B2 | 3/2002 | Wu et al. |
| 6,385,371 B1 | 5/2002 | Li |
| 6,445,855 B1 | 9/2002 | Stowe et al. |
| 6,466,717 B1 | 10/2002 | Gonthier |
| 6,558,958 B1 | 5/2003 | Pilevar et al. |
| 6,563,981 B2 | 5/2003 | Weisberg et al. |
| 6,718,095 B1 | 4/2004 | Gonthier |
| 6,728,439 B2 | 4/2004 | Weisberg et al. |
| 6,771,412 B2 | 8/2004 | Torchigin |
| 6,788,864 B2 | 9/2004 | Ahmad et al. |
| 6,801,698 B2 | 10/2004 | King et al. |
| 6,822,786 B2 | 11/2004 | Wu et al. |
| 6,836,606 B2 | 12/2004 | Abeeluck et al. |
| 6,895,154 B2 | 5/2005 | Johnson et al. |
| 6,898,359 B2 | 5/2005 | Soljacic et al. |
| 6,987,783 B2 | 1/2006 | Fajardo et al. |
| 7,072,553 B2 | 7/2006 | Johnson et al. |
| 7,106,932 B2 | 9/2006 | Birks et al. |
| 7,142,756 B2 | 11/2006 | Anderson et al. |
| 7,190,875 B2 | 3/2007 | Anderson et al. |
| 7,209,619 B2 | 4/2007 | Dong et al. |
| 7,295,739 B2 | 11/2007 | Solarz |
| 7,308,171 B2 | 12/2007 | Booth et al. |
| 7,379,648 B1 | 5/2008 | Brooks et al. |
| 7,742,665 B2 * | 6/2010 | Digonnet et al. ............... 385/43 |
| 2002/0054740 A1 | 5/2002 | Vakili et al. |
| 2002/0133111 A1 | 9/2002 | Shadduck |
| 2003/0002795 A1 | 1/2003 | Fisher et al. |
| 2003/0031407 A1 | 2/2003 | Weisberg et al. |
| 2003/0044158 A1 | 3/2003 | King et al. |
| 2003/0044159 A1 | 3/2003 | Anderson et al. |
| 2003/0049003 A1 | 3/2003 | Ahmad et al. |
| 2003/0109055 A1 | 6/2003 | Lehmann et al. |
| 2003/0169987 A1 | 9/2003 | Eggleton et al. |
| 2003/0180001 A1 | 9/2003 | Gonthier |
| 2003/0185505 A1 | 10/2003 | Weisberg et al. |
| 2004/0175082 A1 | 9/2004 | Birks et al. |
| 2004/0233941 A1 | 11/2004 | Fajardo et al. |
| 2004/0258353 A1 | 12/2004 | Gluckstad et al. |
| 2005/0111805 A1 | 5/2005 | Hertz et al. |
| 2005/0157998 A1 | 7/2005 | Dong et al. |
| 2005/0259944 A1 | 11/2005 | Anderson et al. |
| 2005/0265403 A1 | 12/2005 | Anderson et al. |
| 2005/0265675 A1 | 12/2005 | Welker et al. |
| 2006/0193583 A1 | 8/2006 | Dong et al. |
| 2007/0237453 A1 | 10/2007 | Nielsen et al. |

OTHER PUBLICATIONS

Chandalia et al., "Adiabatic coupling in tapered air-silica microstructured optical fiber," IEEE Photonics Technology Letters, Jan. 2001, vol. 13, No. 1, pp. 52-54.

Christov et al., "Dispersion-controlled hollow core fiber for phase matched harmonic generation," Optics Express, 1998, vol. 3, No. 10, pp. 360-365.

Domachuk, et al., "Tapered high-fill photonic crystal fiber," Conference on Lasers and Electro-Optics, May 22, 2005, pp. 692-694.

Domachuk, et al., "Transverse characterization of high air-fill fraction tapered photonic crystal fiber," Applied Optics, Jul. 1, 2005, vol. 44, No. 19, pp. 3885-3892.

Examination Report for EP 07813361.8 (STANF.152VEP) dated Jun. 5, 2009.

Fini, J. "Design of solid and microstructure fibers for suppression of higher-order modes," Optics Express, May 2, 2005, vol. 13, No. 9, pp. 3477-3490.

International Preliminary Report on Patentability in corresponding International Application No. PCT/US2007/074373 (STANF.152VPC) dated Jun. 25, 2008.

International Search Report issued in corresponding International Application No. PCT/US2007/074373 (STANF.152VPC) dated Jan. 15, 2008.

Ishii et al., "Low-loss fibre-pigtailed 256 channel arrayed waveguide grating multiplexer using cascaded laterally-tapered waveguides," Electronics Letters, 2001, vol. 37, No. 23, pp. 1401-1402.

Kerbage, et al., "Integrated all-fiber variable attenuator based on hybrid microstructure fiber," Applied Physics Letters, Nov. 5, 2001, vol. 79, No. 19, pp. 3191-3193.

Magi et al., "Tapered photonic crystal fibers," Optics Express, Mar. 8, 2004, vol. 12, No. 5, pp. 776-784.

Magi, et al., "Transverse characterization of tapered photonic crystal fibers," Journal of Applied Physics, Oct. 1, 2004, vol. 96, No. 7, pp. 3976-3982.

Nguyen et al., "Tapered photonic crystal fibres: Characterisation and applications," Proc. of SPIE, 2005, vol. 5840, pp. 29-43.

Town et al., "Tapered holey fibers for spot-size and numerical-aperture conversion," Optics Letters, Jul. 15, 2001, vol. 26, No. 14, pp. 1042-1044.

Wadsworth et al., "Hole inflation and tapering of stock photonic crystal fibres," Aug. 22, 2005, vol. 13, No. 7, pp. 6541-6549.

Written Opinion issued in corresponding International Application No. PCT/US2007/074373 (STANF.152VPC) dated Jan. 29, 2008.

Zhou et al., "Hollow-core tapered coupler for large inner diameter hollow-core optical fibers," Chinese Optics Letters, Jan. 20, 2003, vol. 1, No. 1, pp. 15-17.

* cited by examiner

US 8,009,948 B2

APPARATUS AND METHODS USING HOLLOW-CORE FIBER TAPERS

CLAIM OF PRIORITY

This application is a continuation from U.S. patent application Ser. No. 11/828,277, filed Jul. 25, 2007, which is incorporated in its entirety by reference herein, and which claims the benefit of U.S. Provisional Appl. No. 60/833,108, filed Jul. 25, 2006, which is incorporated in its entirety by reference herein.

BACKGROUND OF THE INVENTION

1. Field of the Invention

The present invention relates generally to devices and methods using optical fiber tapers and bitapers.

2. Description of the Related Art

Fiber tapers and bitapers have found a wide range of important applications in optical communication and sensing, including as fused couplers, narrow-band filters, for mode-matching between waveguides, and for evanescent mode coupling. See, e.g., A. W. Snyder, "Coupling of modes on a tapered dielectric cylinder," IEEE Trans. Microwave Theory and Techniques, 1970, Vol. 18, pp. 383-392; D. T. Cassidy, D. C. Johnson, and K. O. Hill, "Wavelength-dependent transmission of monomode optical fiber tapers," Appl. Opt., 1985, Vol. 24, pp. 945-950; S. Lacroix, F. Gonthier, and J. Bures, "All-fiber wavelength filter from successive biconical tapers," Opt. Lett., 1986, Vol. 11, pp. 671-673; D. Marcuse, "Mode conversion in optical fibers with monotonically increasing core radius," J. Lightwave Technol., 1987, Vol. B, pp. 125-133; J. D. Love et al., "Tapered single-mode fibres and devices, Part I," IEEE Proc., 1991, Vol. 138, pp. 343-354; R. J. Black et al., "Tapered single-mode fibres and devices, Part II," IEEE Proc., 1991, Vol. 138, pp. 355-364.

In the portion of a conventional fiber bitaper that necks down, the geometrical perturbation of the core couples the fundamental core mode ($HE_{11}$) to one or more cladding modes (e.g., $HE_{12}$, $HE_{13}$, etc.). Because the coupled modes have different phase velocities, as they travel along the central portion of the bitaper, they accumulate a differential phase shift $\Delta\phi$. Past this region, the bitaper diameter increases and the two (or more) modes exchange energy again. Depending on $\Delta\phi$, power is either coupled back to the core mode (taper then has a high transmission) or remains in the cladding modes (low transmission). Because this coupling is wavelength dependent, the transmission spectrum exhibits a nearly periodic modulation. For conventional fiber tapers, the period is typically 10-40 nanometers and the modulation depth ranges from 0 to about 20 dB, depending on the strength of the taper (which can be defined as the ratio between the diameter of the neck and the original fiber diameter).

SUMMARY OF THE INVENTION

In certain embodiments, an optical filter is provided. The optical filter comprises a hollow-core fiber comprising a first portion and a second portion. The first portion comprises a hollow core having a first diameter and a cladding having a second diameter. The second portion comprises a hollow core having a third diameter smaller than the first diameter and a cladding having a fourth diameter smaller than the second diameter.

In certain embodiments, a method of forming an optical filter is provided. The method comprises providing a hollow-core fiber having an axis, a first portion, a second portion, and a third portion positioned between the first portion and the second portion along the axis. The third portion has a first diameter. The method further comprises heating at least the third portion of the hollow-core fiber to a temperature at which the third portion is plastically deformable. The method further comprises pulling at least one of the first portion and the second portion along the axis such that a distance between the first portion and the second portion increases, thereby stretching and plastically deforming the third portion such that the third portion has a second diameter less than the first diameter.

In certain embodiments, a method of filtering an optical signal is provided. The method comprises providing a hollow-core fiber comprising a first portion and a second portion. The first portion comprising a hollow core having a first diameter and a cladding having a second diameter. The second portion comprises a hollow core having a third diameter smaller than the first diameter and a cladding having a fourth diameter smaller than the second diameter. The method further comprises transmitting an optical signal through the first portion of the hollow-core fiber to the second portion of the hollow-core fiber. A first portion of the optical signal having a first range of wavelengths is transmitted through the second portion of the hollow-core fiber and a second portion of the optical signal having a second range of wavelengths is not transmitted through the second portion of the hollow-core fiber.

In certain embodiments, a laser is provided. The laser comprises a hollow-core fiber comprising a first portion comprising a hollow core having a first diameter and a cladding having a second diameter. The hollow-core fiber further comprises a second portion comprising a hollow core having a third diameter smaller than the first diameter and a cladding having a fourth diameter smaller than the second diameter. The hollow-core fiber further comprises a third portion having a hollow core having a fifth diameter larger than the third diameter and a cladding having a sixth diameter larger than the fourth diameter. The laser further comprises two optical reflectors. The laser further comprises a gain medium in optical communication with one of the two reflectors. The hollow-core fiber is in optical communication with the gain medium and the other of the two optical reflectors.

In certain embodiments, a method of generating laser light is provided. The method comprises providing a hollow-core fiber in an optical resonating region having a fundamental mode spectrum. The hollow-core fiber comprises a first portion comprising a hollow core having a first diameter and a cladding having a second diameter. The hollow-core fiber further comprises a second portion comprising a hollow core having a third diameter smaller than the first diameter and a cladding having a fourth diameter smaller than the second diameter. The hollow-core fiber further comprises a third portion having a hollow core having a fifth diameter larger than the third diameter and a cladding having a sixth diameter larger than the fourth diameter. The method further comprises providing a gain medium in the optical resonating region. The gain medium is in optical communication with the hollow-core fiber. The method further comprises using the hollow-core fiber to filter light from the gain medium by removing light having one or more wavelengths different from the fundamental mode spectrum.

In certain embodiments, an optical sensor is provided. The optical sensor comprises a hollow-core fiber comprising a first portion comprising a hollow core having a first diameter and a cladding having a second diameter. The hollow-core fiber further comprises a second portion comprising a hollow core having a third diameter smaller than the first diameter and a cladding having a fourth diameter smaller than the second diameter. The hollow-core fiber further comprises a third portion having a hollow core having a fifth diameter larger than the third diameter and a cladding having a sixth diameter larger than the fourth diameter. The hollow core of the second portion is configured to receive a specimen comprising one or more chemicals or biological materials. A transmission spectrum of the hollow-core fiber is indicative of the presence of a predetermined molecule or molecular species in the specimen.

In certain embodiments, a method of sensing the presence of one or more chemicals or biological materials in a specimen is provided. The method comprises providing a hollow-core fiber comprising a first portion comprising a hollow core having a first diameter and a cladding having a second diameter. The hollow-core fiber further comprises a second portion comprising a hollow core having a third diameter smaller than the first diameter and a cladding having a fourth diameter smaller than the second diameter. The hollow-core fiber further comprises a third portion having a hollow core having a fifth diameter larger than the third diameter and a cladding having a sixth diameter larger than the fourth diameter. The method further comprises inserting the specimen into the hollow-core fiber. The method further comprises detecting a transmission spectrum of the hollow-core fiber while the specimen is within the hollow-core fiber. The transmission spectrum is indicative of the presence of a predetermined molecule or molecular species in the specimen.

DETAILED DESCRIPTION OF THE PREFERRED EMBODIMENT

Figure 1A:
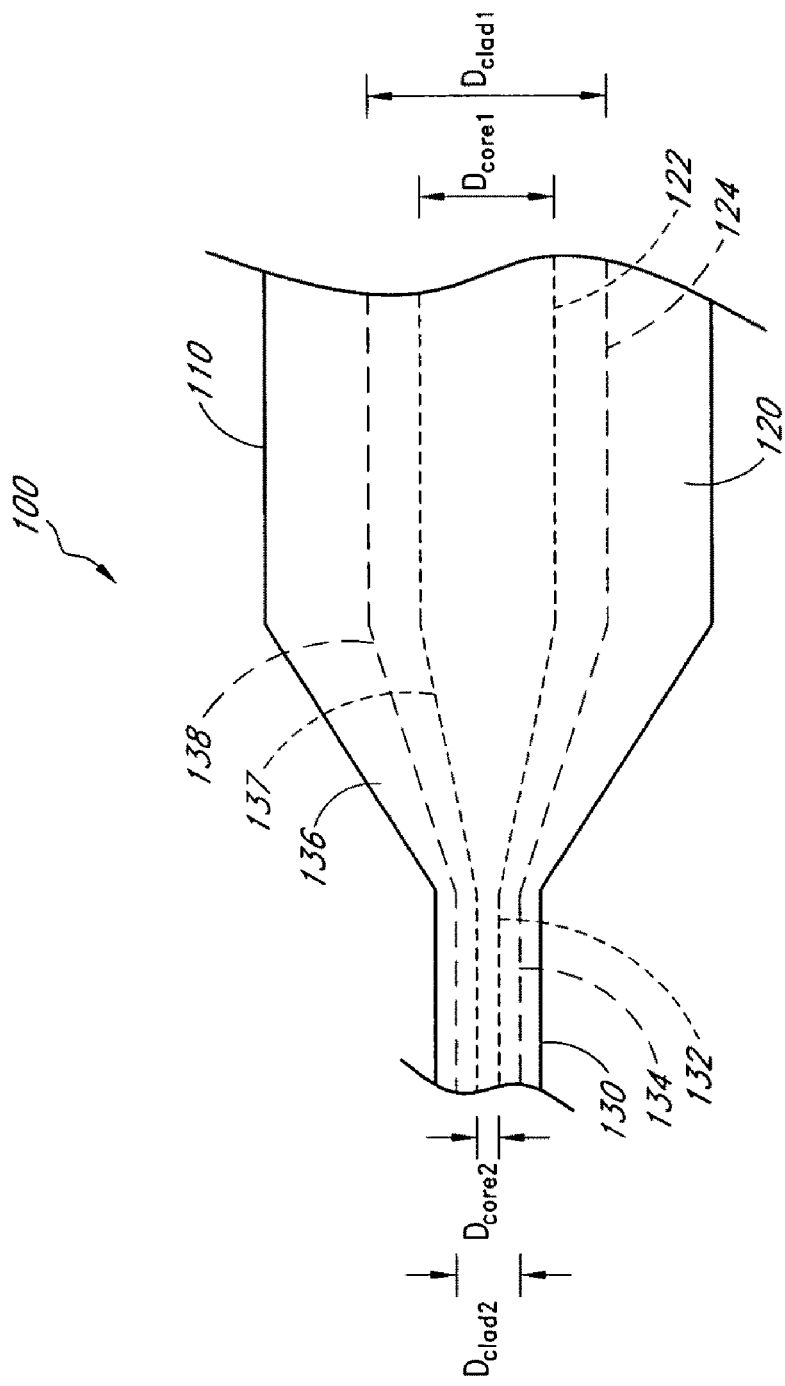
FIGS. 1A-1D schematically illustrate example optical filters in accordance with certain embodiments described herein.

Applying taper-based technologies to hollow-core (e.g., air-core) fibers in accordance with certain embodiments described herein can provide advantageous results. In certain embodiments, tapered air-core fibers are used to create optical components with different optical properties (e.g., filter linewidth, wavelength dependence of coupling, and polarization dependence) than are available from conventional tapered fibers. In addition, the availability of these components utilizing tapered air-core fibers in certain embodiments eliminates the current need to splice conventional solid-core fiber components to air-core fibers to assemble air-core fiber systems, such as sensors. See, e.g., H. K. Kim, V. Dangui, M. Digonnet, and G. Kino, "Fiber-optic gyroscope using an air-core photonic bandgap fiber," 17th International Conference on Optical Fiber Sensors, Bruges, Belgium, May 2005, Proc. of SPIE, Vol. 5855 part I, pp. 198-201. Such splices are difficult to make, and they can introduce a substantial back-reflection (e.g., about 4%), which can have strongly deleterious effects in some systems, especially amplifiers and interferometric sensors. There have been several studies of bitapers in solid-core microstructured fibers (see, e.g., J. K. Chandalia et al., "Adiabatic coupling in tapered air-silica microstructured optical fiber," IEEE Photon. Technol. Lett., 2001, Vol. 13, pp. 52-54; G. E. Town and J. T. Lizier, "Tapered holey fibers for spot size and numerical aperture conversion," IEEE Photon. Technol. Lett., 2001, Vol. 26, pp. 1042-1044; E. C. Magi, P. Steinvurzel, and B. J. Eggleton, "Tapered photonic crystal fibers," Opt. Expr., 2004, Vol. 12, pp. 776-784). However, as described more fully below, tapered air-core fibers (e.g., tapered air-core photonic-bandgap fibers (PBFs)) and optical devices utilizing such tapered air-core fibers have beneficial properties such as relatively high transmission (for relatively weak tapers), rapid oscillations in the transmission spectrum, large amplitudes of these oscillations, even for relatively weak tapers, and dramatically reduced third-order optical nonlinearity. In certain embodiments, tapers and bitapers fabricated in hollow-core fibers having these combined properties are advantageous for use in a variety of applications.

Certain embodiments described herein comprise bitapers in air-core fibers, optical devices utilizing such bitapered air-core fibers, and the fabrication and characterization thereof. Spectra of experimental measurements of the transmission spectrum of bitapered air-core photonic-bandgap fibers (PBFs) in accordance with certain embodiments described herein exhibit similar quasi-sinusoidal modulation as conventional bitapers, demonstrating that resonant coupling is taking place, and that the resonant coupling is mostly to one dominant cladding mode. However, unlike in conventional bitapers of comparable length, the modulation period of certain embodiments described herein is very short (e.g., 0.5-3.3 nanometers), which suggests that coupling takes place to a very high order cladding mode. Unlike conventional tapers, such coupling is observed even in certain embodiments utilizing comparatively weak bitapers (e.g., diameter reduction as low as about 2% or less), indicating that the air-core fibers are highly sensitive to tapering. The transmission loss of weak tapers in certain embodiments is observed to be small (e.g., less than about 0.3 dB), which facilitates applications of this simple technology as in-line filters of high resolution.

FIG. 1A schematically illustrates an example optical filter 100 in accordance with certain embodiments described herein. The optical filter 100 comprises a hollow-core fiber 110 comprising a first portion 120 and a second portion 130. The first portion 120 comprises a hollow core 122 having a first diameter ($D_{core-1}$) and a cladding 124 having a second diameter ($D_{clad-1}$). The second portion 130 comprises a hollow core 132 having a third diameter ($D_{core-2}$) smaller than the first diameter and a cladding 134 having a fourth diameter ($D_{clad-2}$) smaller than the second diameter. In certain embodiments, the hollow core 122, the cladding 124, the hollow core 132, and the cladding 134 each have a generally circular cross-section. In certain other embodiments, one or more of the cores 122, 132 and/or one or more of the claddings 124, 134 has a generally non-circular cross-section. For example, the cores 122, 132 and the claddings 124, 134 of certain embodiments utilizing a photonic-bandgap fiber as described more fully below can have generally hexagonal cross-sections with rounded corners and can comprise various irregularities. In addition, the holes of the core and/or the cladding of a photonic-bandgap fiber can have rounded corners and can comprise various irregularities.

As used herein, the term "diameter" is used in its broadest sense. For example, for a generally non-circular cross-section, the term "diameter" can refer to the largest distance across the cross-section along a line generally through the center of the cross-section, the average distance across the cross-section along a plurality of lines generally through the center of the cross-section, or a characteristic distance across the cross-section along a line generally through the center of the cross-section. For a generally circular cross-section, each of these uses of the term "diameter" are generally equal to one another.

In certain embodiments, the hollow-core fiber 110 comprises a hollow-core photonic-bandgap fiber (PBF). A PBF comprises a hollow core surrounded by a photonic-crystal cladding, itself typically surrounded by an outer cladding. The photonic-crystal cladding comprises a two-dimensional array of hollow holes arranged in a periodic pattern, as illustrated for example in the photograph of FIG. 2. Examples of the periodic pattern of the holes include but are not limited to triangular and Kagome. The size of the holes, the thickness of the thin membranes surrounding and between the holes, and the material forming the solid portions of the photonic-crystal cladding, are designed such that the PBF supports a photonic bandgap in the wavelength region of interest for the selected application of the PBF. Within this bandgap, no modes can propagate along the axis of the PBF. The presence of the core, which constitutes a defect, breaks the symmetry of the cladding, and in so doing it introduces new modes that can propagate within the bandgap. In certain embodiments, the PBF comprises a triangular pattern of nominally circular holes fabricated in a matrix of silica, and the core is formed by removing seven cells from the center of the periodic structure of the cladding, as is the case of the fiber of FIG. 2.

Figure 2:
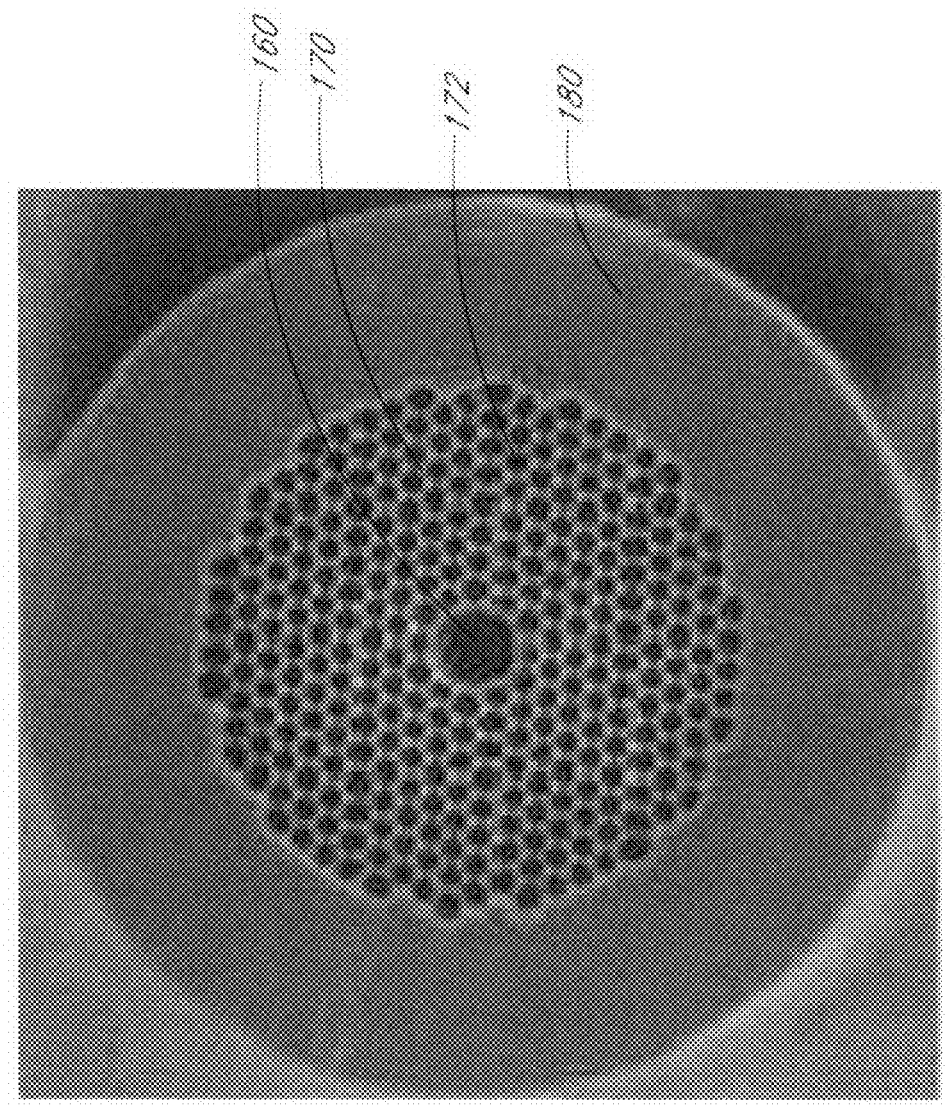
FIG. 2 is a scanning electron microscope photograph of the cross-section of an example Blaze Photonics fiber compatible with certain embodiments described herein.

For example, in certain embodiments, the hollow-core fiber 110 is a Blaze Photonics hollow-core PBF HC-1550-02. FIG. 2 shows a scanning electron microscope (SEM) photograph of the cross-section of such an example hollow-core PBF compatible with certain embodiments described herein. The hollow-core PBF shown in FIG. 2 has a core 160 filled with air, another gas, another combination of gases, or a vacuum, and a diameter of 10.9 microns, surrounded by a photonic-crystal cladding 170 made of a triangular lattice of holes 172, also filled with air, another gas, another combination of gases, or a vacuum, with a period of 3.8 microns. In certain embodiments, the hollow-core PBF further comprises an outer cladding 180 surrounding the photonic-crystal cladding 170. The cladding 170 supports a photonic bandgap centered around 1600 nanometers and extending from about 1520 nanometers to about 1680 nanometers (the wavelengths at which the loss is 3-dB higher than it is at the lowest loss wavelength, which is near the center of the bandgap). Certain embodiments described herein utilize hollow-core PBFs having other core diameters, photonic-crystal cladding patterns or periodicities, and bandgap wavelength ranges.

In certain embodiments, the hollow-core fiber 110 comprises a hollow-core Bragg fiber. In a hollow-core Bragg fiber, the core has a nominally circular shape (other shapes are also possible) surrounded by a cladding made of a solid material (e.g., silica). In certain embodiments, guidance is provided by a series of multilayer coatings deposited on the inner surface of the cladding (e.g., at the interface between the core and the cladding). With proper selection of the number of coatings, of their thicknesses (typically a fraction of a wavelength), and their indices of refraction (typically, alternating from high to low index), this multilayer coating acts as a reflector that guides light within the core at certain wavelengths.

The core of the hollow-core fiber 110, whether it is a hollow-core PBF or a hollow-core Bragg fiber, can be filled with various non-solid materials. For example, the core can be filled with air, with any other gas or combination of gases, with a liquid (provided the fiber structure is designed so as to function in the presence of a liquid, whose higher index of refraction may affect the waveguiding properties of the fiber negatively). In addition, the core can be evacuated or under vacuum.

In certain embodiments, the first portion 120 and the second portion 130 are coupled together by a tapered portion 136 having a hollow core 137 with a diameter varying along the portion 136 and a cladding 138 with a diameter varying along the length of the tapered portion 136. In certain embodiments, the diameter of the hollow core 137 is monotonically-varying along the length of the tapered portion 136 and the diameter of the cladding 138 is monotonically-varying along the length of the tapered portion 136. In certain other embodiments, at least one of the diameter of the hollow core 137 and the diameter of the cladding 138 is non-monotonically-varying along the length of the tapered portion 136.

Figure 1B:
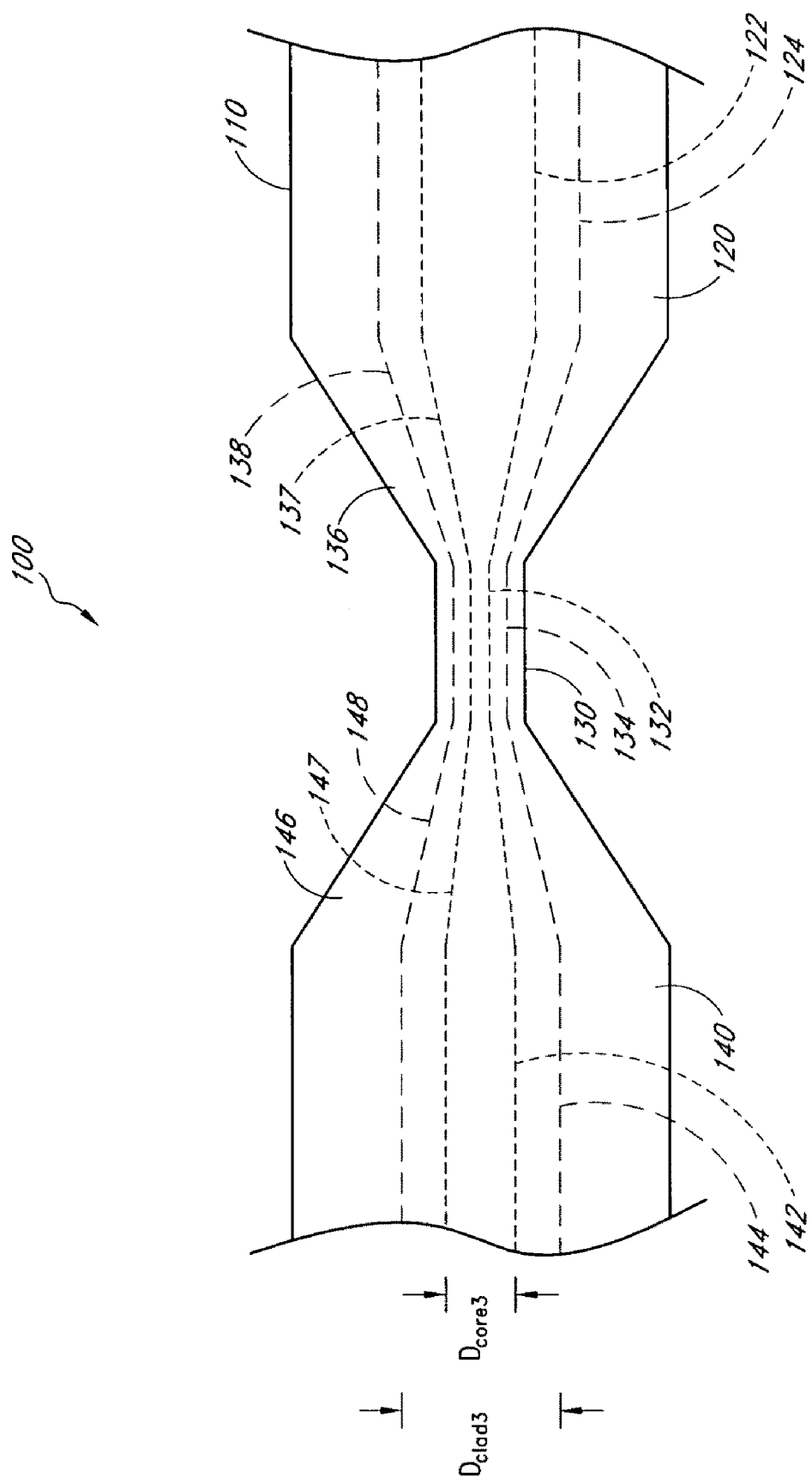

FIG. 1B schematically illustrates another example optical filter 100 in accordance with certain embodiments described herein. The optical fiber 110 further comprises a third portion 140 having a hollow core 142 having a fifth diameter ($D_{core-3}$) larger than the third diameter and a cladding 144 having a sixth diameter ($D_{clad-3}$) larger than the fourth diameter. In certain embodiments, the fifth diameter is substantially equal to the first diameter and the sixth diameter is substantially equal to the second diameter, as schematically illustrated by FIGS. 1C and 1D.

In certain embodiments, the third portion 140 and the second portion 130 are coupled together by a tapered portion 146 having a hollow core 147 with a diameter varying along the tapered portion 146 and a cladding 148 with a diameter varying along the length of the tapered portion 146. In certain embodiments, the diameter of the hollow core 147 is monotonically-varying along the length of the tapered portion 146 and the diameter of the cladding 148 is monotonically-varying along the length of the tapered portion 146. In certain other embodiments, at least one of the diameter of the hollow core 147 and the diameter of the cladding 148 is non-monotonically-varying along the length of the tapered portion 146.

Figure 1C:
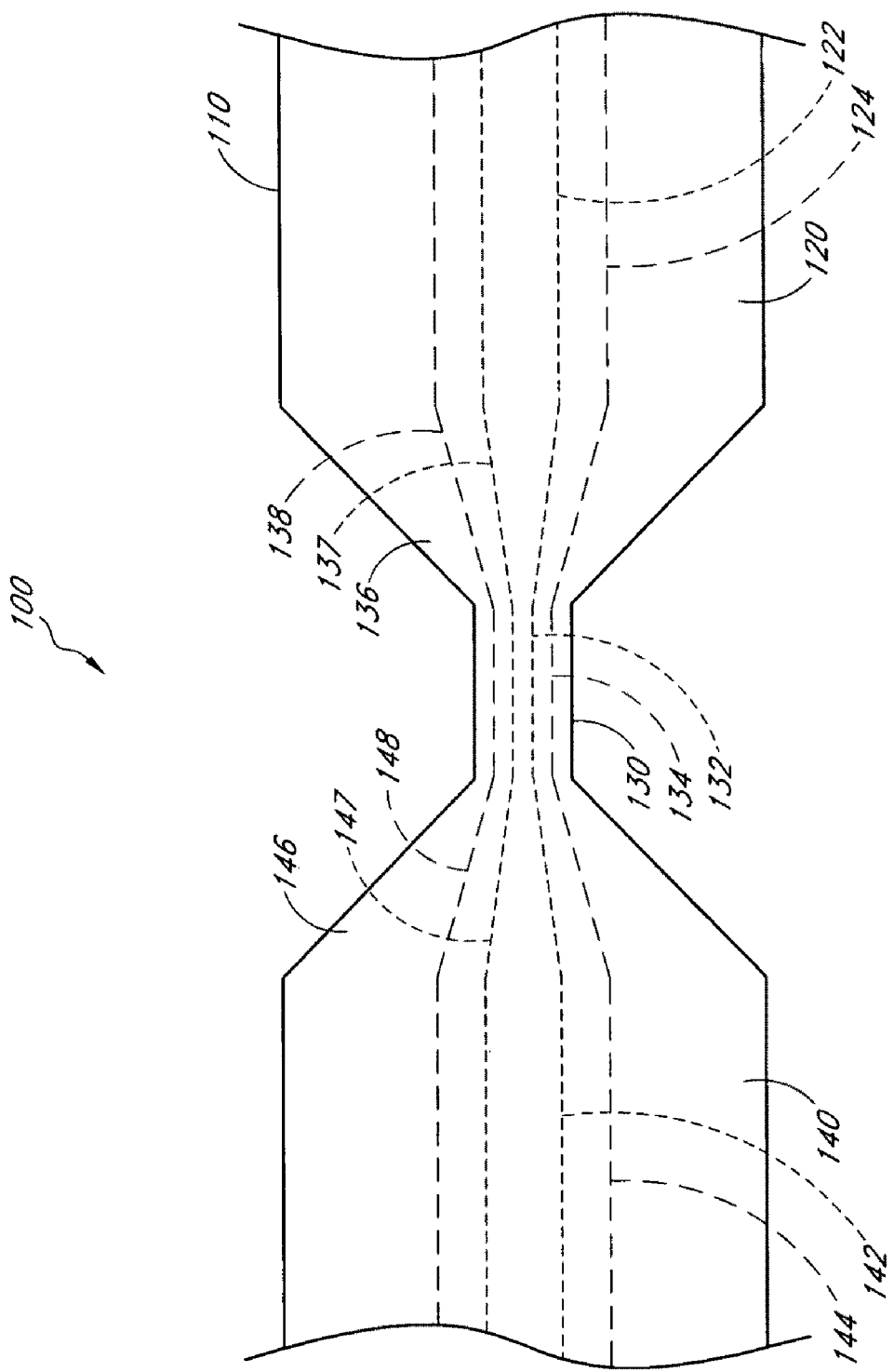
Figure 1D:
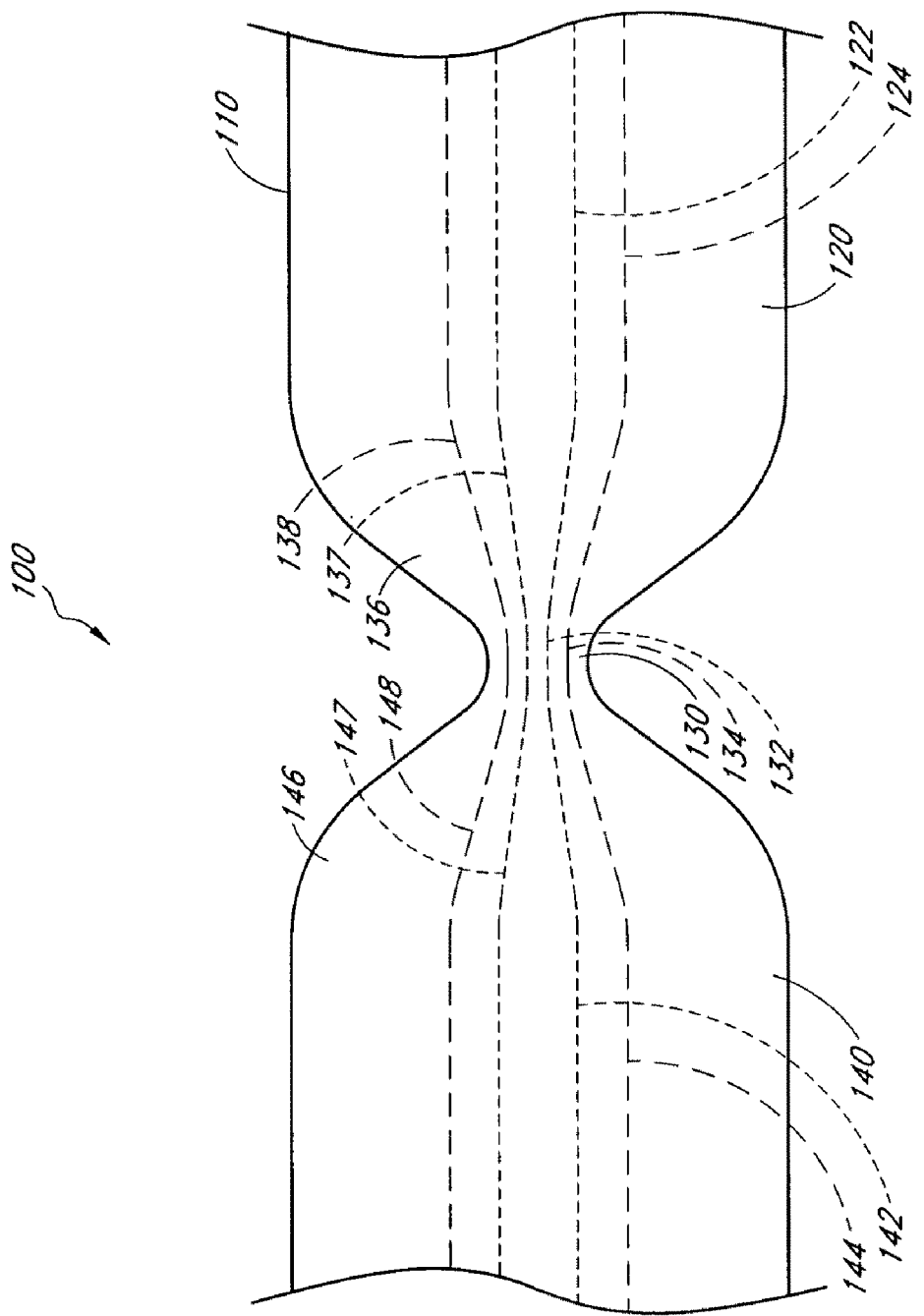

As used herein, the terms "tapered fiber" or "fiber taper" or "taper" are used in their broadest sense, including but not limited to, fibers which have a pair of fiber portions with different diameters joined by a section with varying diameter (e.g., as schematically illustrated by FIG. 1A) and fibers which have more than two fiber portions with different diameters joined by corresponding sections with varying diameters (e.g., as schematically illustrated by FIGS. 1B, 1C, and 1D). As used herein, the terms "bitapered fiber" or "fiber bitaper" or "bitaper" are used in their broadest sense, including but not limited to, fibers which have more than two fiber portions with different diameters joined by corresponding sections with varying diameters (e.g., as schematically illustrated by FIGS. 1B, 1C, and 1D).

In certain embodiments, the diameters of the fiber sections 136, 146, as well as the diameters of the hollow cores 137, 147 and the claddings 138, 148, monotonically vary along the length of the fiber sections 136, 146, as schematically illustrated by FIGS. 1A-1D. For example, the diameter of the core 137 varies monotonically from the first diameter ($D_{core-1}$) to the third diameter ($D_{core-2}$) across the length of the fiber section 136. Similarly, the diameter of the cladding 138 varies monotonically from the second diameter ($D_{clad-1}$) to the fourth diameter ($D_{clad-2}$) across the length of the fiber section 136. Other variations of these diameters along the length of the fiber sections 136, 146 are also compatible with various embodiments described herein.

Figure 3:
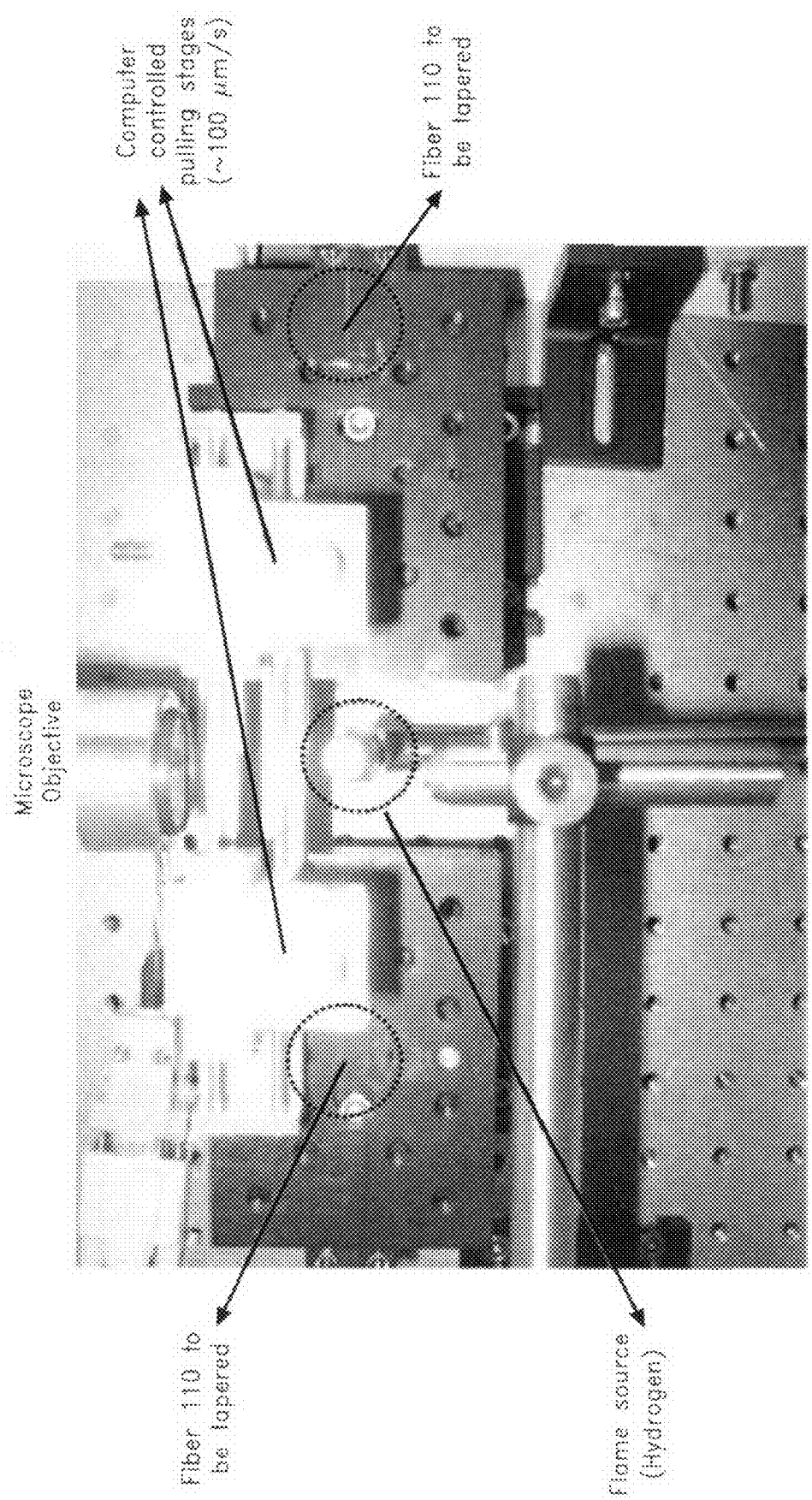
FIG. 3 is a photograph of the experimental station used to pull air-core fiber bitapers in accordance with certain embodiments described herein.
Figure 4:
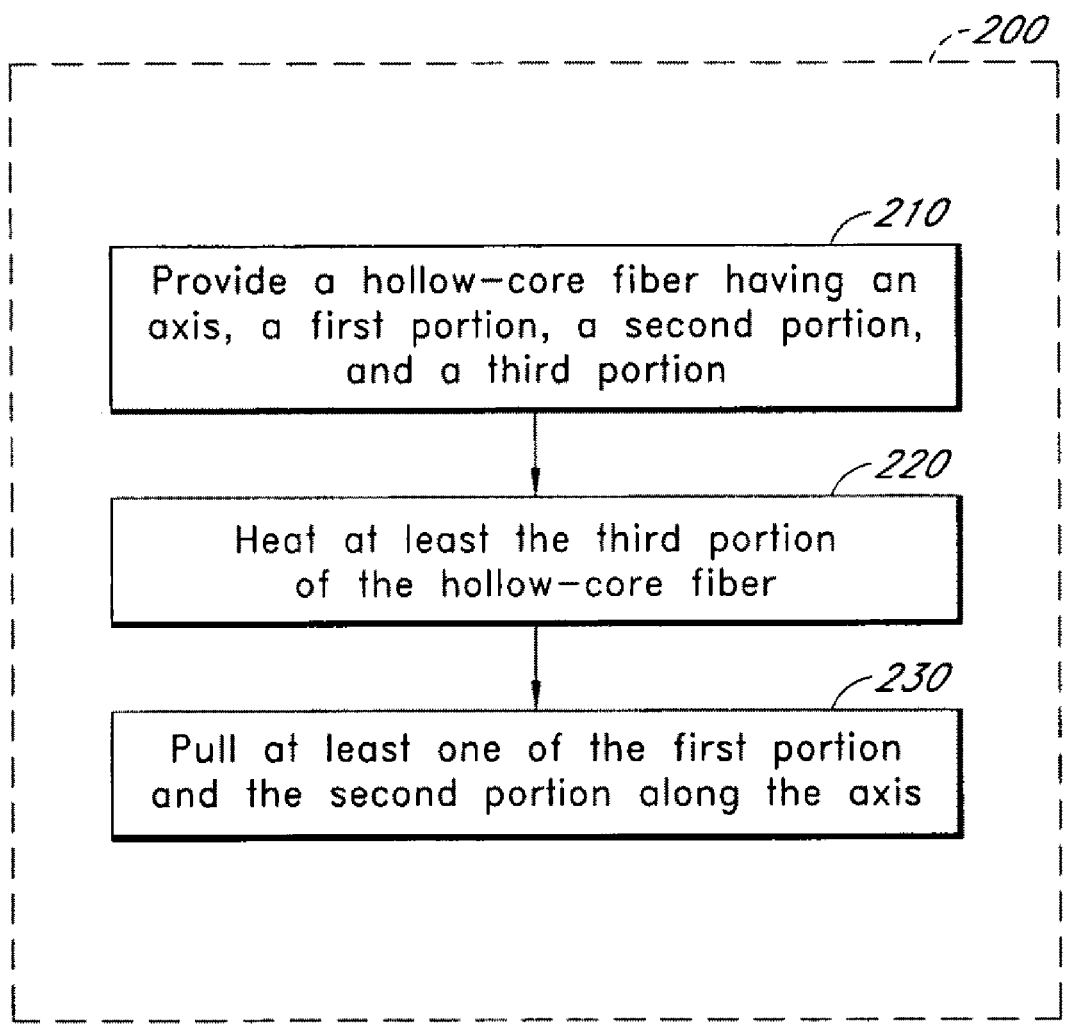
FIG. 4 is a flowchart of an example method of forming an optical filter in accordance with certain embodiments described herein.

The hollow-core fiber 110 can be tapered using the set-up shown in FIG. 3 in accordance with certain embodiments described herein. FIG. 4 is a flowchart of an example method 200 of forming an optical filter 100 in accordance with certain embodiments described herein. The method 200 comprises providing a hollow-core fiber 110, as shown in the operational block 210 of FIG. 4. The hollow-core fiber 110 has an axis, a first portion, a second portion, and a third portion. The third portion is positioned between the first portion and the second portion along the axis. The third portion has a first diameter.

The method 200 further comprises heating at least the third portion of the hollow-core fiber 110 to a temperature at which the third portion is plastically deformable, as shown in the operational block 220 of FIG. 4. The method 200 further comprises pulling at least one of the first portion and the second portion along the axis such that a distance between the first portion and the second portion increases, as shown in the operational block 230 of FIG. 4. This pulling stretches and plastically deforms the third portion such that the third portion has a second diameter less than the first diameter.

In certain embodiments, pulling at least one of the first portion and the second portion comprises pulling only either the first portion or the second portion while the other of the first and second portions remains fixed. In certain other embodiments, pulling at least one of the first portion and the second portion comprises pulling both the first portion and the second portion in opposite directions. In certain embodiments, the hollow-core fiber 110 comprises a hollow core, a cladding surrounding the hollow core, and a jacket surrounding the cladding. In certain such embodiments, the method 200 further comprises removing the jacket from the hollow-core fiber 110 prior to heating at least the third portion.

In certain embodiments, after removing the polymer jacket from the hollow-core fiber 110, the hollow-core fiber 110 can be positioned above the flame of a miniature hydrogen torch and pulled from both sides using two computer-controlled motorized micro-positioners. Alternatively in other embodiments, the hollow-core fiber 110 can be pulled from a single side while the other side remains fixed. Other sources of heat, such as with other types of torches, electrical coils, an electric arc, a $CO_2$ laser, a CO laser, or other lasers, for example, can also be used for softening the hollow-core fiber 110. The amount of heating can be minimized in certain embodiments to reduce the risk of collapsing the air holes of either the core or the cladding. The pulling speed in certain embodiments is about 100 microns per second. In certain embodiments, the tapering process can be monitored visually by imaging the heated region onto a charge-coupled device (CCD) camera with a microscope objective, as shown in FIG. 3. Various other tapering procedures are also compatible with certain embodiments described herein (e.g., using other pulling speeds, temporal heating patterns, spatial heating patterns).

In certain embodiments, an asymmetric bitaper can be fabricated by making a bitaper in a hollow-core fiber, as described above, and then reducing the diameter of one of the first and third portions by applying heat and pulling the fiber, and moving the heat source so as to produce a constant diameter reduction over a substantial length (e.g., 2-4 mm). In certain other embodiments, an asymmetric bitaper can be fabricated by first reducing the diameter of one of the first and third portions, and then forming the bitaper therebetween. In certain embodiments, overlapping, step-like, or concatenated tapers can be formed using various techniques in accordance with certain embodiments described herein.

Several short pieces (1-10 centimeters) of a photonic-bandgap fiber were thus tapered as described above, with different diameter reductions, to produce the tapered air-core PBFs from which the measurements described herein were made. The strength of the taper was characterized by the tapering ratio $\Delta D/D$, where D is the PBF outer diameter prior to tapering (e.g., 120 microns) and $\Delta D$ is the reduction in the fiber, diameter at the neck of the taper (e.g., at the smallest diameter of the tapered region). In certain embodiments, the ratio of the core diameter and the cladding diameter in the first portion 120 is substantially equal to the ratio of the core diameter and the cladding diameter in the second portion 130.

Although it appeared under higher magnification that many of the holes survived the tapering process, even in relatively strong bitapers ($\Delta D/D>25\%$), more careful inspection of a taper cross-section with an SEM is helpful to evaluate the integrity of the bitaper's crystal lattice.

Figure 5:
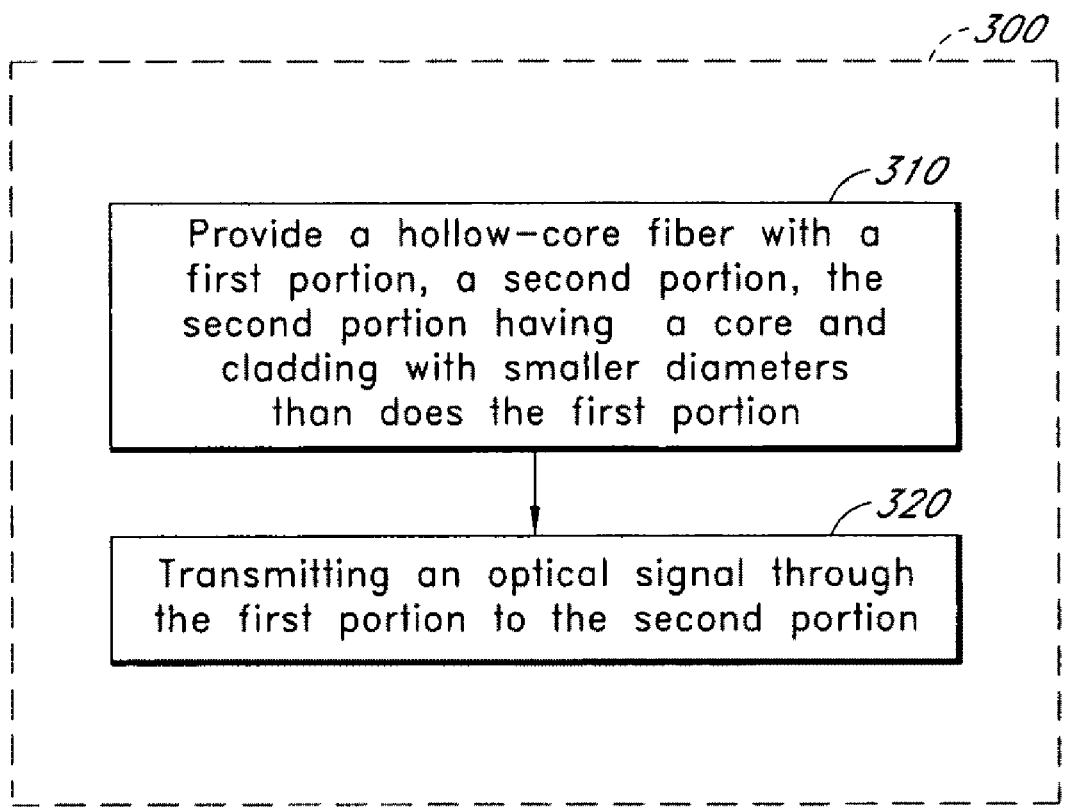
FIG. 5 is a flowchart of an example method of filtering an optical signal in accordance with certain embodiments described herein.

FIG. 5 is a flowchart of an example method 300 of filtering an optical signal in accordance with certain embodiments described herein. The method 300 comprises providing a hollow-core fiber 110 comprising a first portion 120 and a second portion 130, as shown in the operational block 310 of FIG. 5. The first portion 120 comprises a hollow core 122 having a first diameter and a cladding 124 having a second diameter. The second portion 130 comprises a hollow core 132 having a third diameter smaller than the first diameter and a cladding 134 having a fourth diameter smaller than the second diameter. The method 300 further comprises transmitting an optical signal through the first portion 120 of the hollow-core fiber 110 to the second portion 130 of the hollow-core fiber 110, as shown in the operational block 320 of FIG. 5. A first portion of the optical signal having a first range of wavelengths is transmitted through the second portion 130 of the hollow-core fiber 110. A second portion of the optical signal having a second range of wavelengths is not transmitted through the second portion 130 of the hollow-core fiber 110.

In certain embodiments, the hollow-core fiber 110 further comprises a third portion 140 having a hollow core 142 having a fifth diameter larger than the third diameter and a cladding 144 having a sixth diameter larger than the fourth diameter. In certain such embodiments, the method 300 further comprises transmitting a portion of the second portion of the optical signal through the third portion 130 of the hollow-core fiber 110, wherein the portion of the second portion of the optical signal has a third range of wavelengths.

In an example measurement, the transmission spectra of the bitapered hollow-core PBFs were measured by launching light from a broadband Er-doped superfluorescent fiber source into a single-mode fiber (e.g., Corning's SMF 28 fiber), which was butt-coupled to the cleaved input end of the bitapered hollow-core PBF. The output light from the bitaper was then butt-coupled to another short piece of SMF 28 fiber, which was connected to an optical spectrum analyzer for transmission spectrum measurements. The second SMF 28 fiber was used to filter out the cladding modes of the hollow-core PBF and thus measure the spectrum of the fundamental mode of the hollow-core bitaper only. Each spectrum was then normalized to the measured spectrum of an untapered hollow-core PBF excited in the same manner. During butt-coupling alignments, a microscope was used to view the coupled fibers from two sides and ensure that the cores faced each other to minimize coupling to cladding modes of the PBF, which would have produced erroneous results such as large random fluctuations in the spectrum from modal interference. Residual imprecision in this alignment resulted in small but finite variations in the measured transmission spectrum from measurement to measurement. These variations were determined experimentally to be approximately independent of wavelength across the fiber bandgap and equal to at most about 2 dB.

Figure 6:
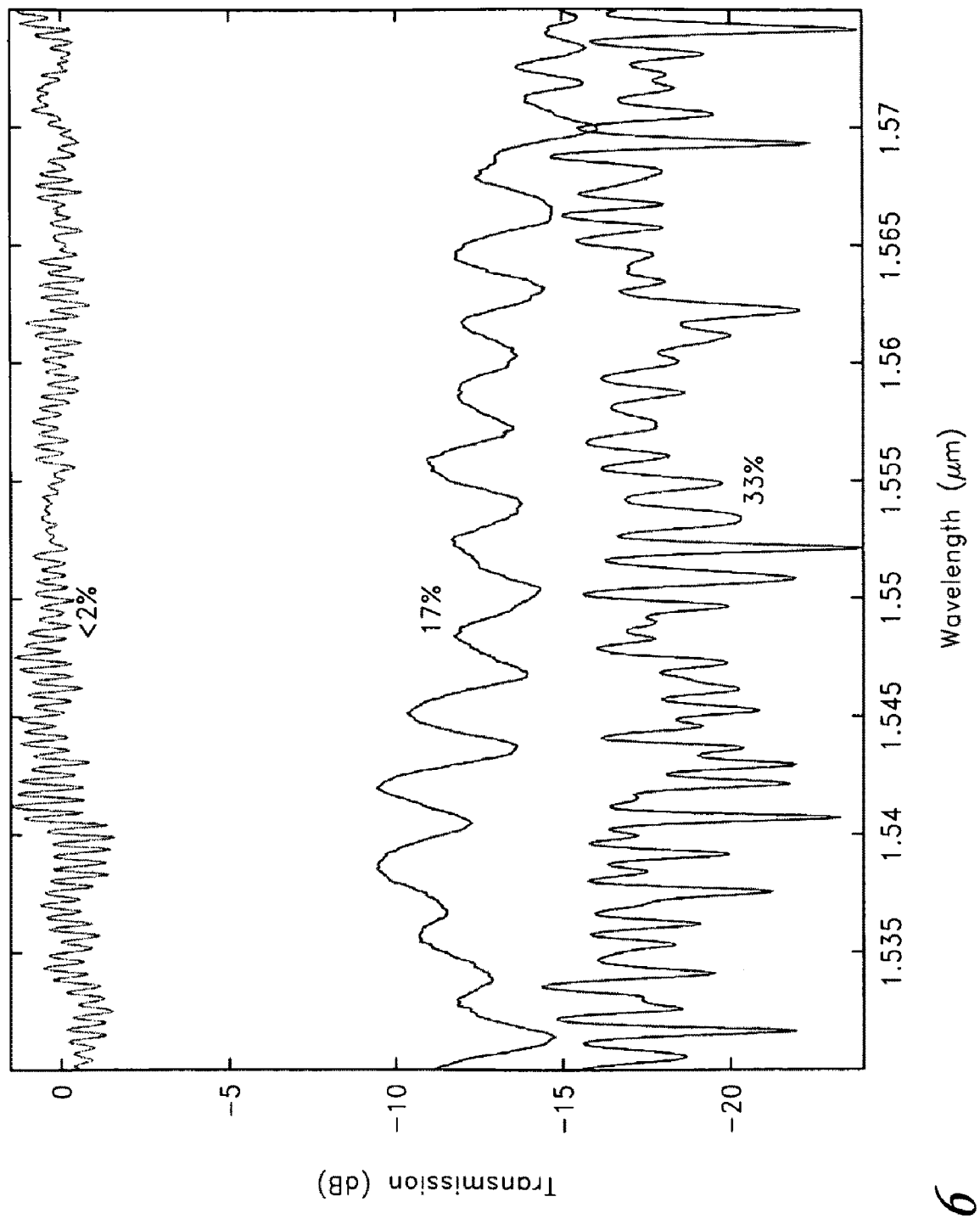
FIG. 6 shows measured transmission spectrum of three air-core fiber tapers in accordance with certain embodiments described herein.

FIG. 6 shows the measured transmission spectra of three example bitapered air-core PBFs, with tapering ratios $\Delta D/D$ of less than about 2% ("the <2% bitapered PBF"), about 17% ("the 17% bitapered PBF"), and about 33% ("the 33% bitapered PBF"), in accordance with certain embodiments described herein. From a geometrical point of view, all of these bitapers are adiabatic, e.g., their length L is much greater than $L_a=\lambda \Delta D/D/\delta n$, where $\lambda$ is the wavelength of light and $\delta n$ is the effective index difference between the core mode and the coupled cladding mode. For example, for the 33% bitapered PBF, $\delta n$ equals about 0.8 (see discussion below) and therefore $L_a$ is less than about $1.5 \times 0.33/10^{-2} \approx 50$ microns, while the bitaper length was about 6 millimeters. The spectrum of the 17% bitapered PBF shows an almost sinusoidal modulation with a period of about 3.3 nanometers. As in solid-core bitapers (see, e.g., D. T. Cassidy, D. C. Johnson, and K. O. Hill, "Wavelength-dependent transmission of monomode optical fiber tapers," Appl. Opt., 1985, Vol. 24, pp. 945-950), this sinusoidal behavior indicates clearly that there is interference between the $HE_{11}$ core mode and a single cladding mode. In the spectra from the other two example bitapered hollow-core PBFs, the observed variation in the amplitude of the oscillations suggests coupling to one dominant cladding mode as well as weaker coupling to one or more secondary cladding modes.

In spite of their similar oscillatory behavior, the transmission spectra of air-core fiber bitapers of certain embodiments described herein differ from those of conventional bitapers in various respects. In certain embodiments, as shown for all three of the example bitapers of FIG. 6, the oscillations are quite large even though the tapering ratios are small. For example, modulation is visible for a tapering ratio of less than 2%. For comparison, in an adiabatic solid-core bitaper fiber, noticeable sinusoidal modulation of the transmission spectrum does not occur until $\Delta D/D$ exceeds about 80%. See, e.g., D. T. Cassidy, D. C. Johnson, and K. O. Hill, "Wavelength-dependent transmission of monomode optical fiber tapers," Appl. Opt., 1985, Vol. 24, pp. 945-950; J. D. Love et al., "Tapered single-mode fibres and devices, Part I," IEEE Proc., 1991, Vol. 138, pp. 343-354; R. J. Black et al., "Tapered single-mode fibres and devices, Part II," IEEE Proc., 1991, Vol. 138, pp. 355-364. In other words, a hollow-core fiber taper is much more sensitive to the tapering than is a conventional fiber taper. Unlike in a conventional fiber taper, in certain embodiments described herein, transmission filters can advantageously be fabricated using a hollow-core fiber by applying minimal physical deformation to the hollow-core fiber, and thus with little to no degradation of its mechanical stability.

Another difference between certain embodiments described herein and conventional fiber bitapers is that the period of oscillations for a hollow-core fiber bitaper is much shorter than in a conventional fiber bitaper. This characteristic implies that the effective index difference $\delta n$ between the coupled modes is much higher for a hollow-core fiber taper than the effective index difference between the $HE_{11}$ and $HE_{12}$ modes of a conventional SMF taper. For non-adiabatic coupling, the connection between the wavelength spacing $(\Delta \lambda)$ between two adjacent transmission peaks in the transmission spectrum and the effective index difference $\delta n$ between the coupled modes can be written as:

$$\Delta \lambda = \frac{\lambda^2}{\delta n L} \quad (1)$$

where $\lambda$ is the geometric mean of the two peak wavelengths and L is the bitaper length. For the three example adiabatic bitapers of FIG. 6, this expression is adequate because adiabaticity is expected to affect mostly the strength of the coupling, and to have a much weaker effect on the periodicity of the peaks.

Table 1 lists the measured oscillation period $\Delta \lambda$ of each example fiber bitaper of FIG. 6 and the $\delta n$ value calculated from $\Delta \lambda$ and the bitaper length L using Equation 1. In certain embodiments, the bitaper length (the length of the deformed region of the hollow-core fiber along its axis, including the tapered portions) can be measured. Alternatively, in certain other embodiments in which the bitaper length is difficult to measure accurately, the bitaper length can be determined from mass conservation and the known amount of elongation applied to the bitaper during fabrication, as was done to provide the values of the bitaper length in Table 1. All inferred values of $\delta n$ are high (see Table 1). In contrast, for a conventional bitaper fabricated in a fiber with NA=0.1, the $\delta n$ for the $HE_{11}$ and $HE_{12}$ modes is typically 0.001-0.003 (see, e.g., D. T. Cassidy, D. C. Johnson, and K. O. Hill, "Wavelength-dependent transmission of monomode optical fiber tapers," Appl. Opt., 1985, Vol. 24, pp. 945-950). This observation shows that in certain embodiments, hollow-core fiber bitapers couple to much higher order cladding modes, namely modes propagating at nearly 90° to the fiber axis. Also, the detuning between coupled modes is much weaker for the 17% bitapered PBF than for the other two bitapered PBFs. The transmission spectrum of the 33% bitapered PBF exhibits a more complex behavior (see FIG. 6), namely a quasi-periodic series of stronger peaks. As pointed out herein, this non-sinusoidal behavior is indicative of coupling to multiple cladding modes. As in conventional bitapers, these peaks occur in the vicinity of wavelengths where most (or all) of the coupled modes are in phase. It should be emphasized that more complex (and perhaps more realistic) model assumptions, such as coupling to multiple random cladding modes, do not appreciably change the inferred values of $\delta n$ listed in Table 1.

TABLE 1

Bitaper dimensions, measured transmission peak spacing, and inferred $\Delta n$ between $HE_{11}$ mode and coupled cladding mode

| Tapering ratio $\Delta D/D$ | Bitaper length L | Measured peak spacing $\Delta \lambda$ | Inferred $\delta n$ |
| --- | --- | --- | --- |
| < about 2% | 9.5 mm | 0.54 nm | 0.47 |
| 17% | 6.2 mm | 3.3 nm | 0.12 |
| 33% | 3.4 mm | 0.9 nm | 0.79 |

In certain embodiments, the hollow-core fiber bitapers exhibit a greatly suppressed third-order nonlinearity, as compared to conventional bitapers. This property in certain embodiments translates in particular to greatly reduced four-wave mixing and Kerr effect, and originates from the fact that the fundamental mode of the air-core fiber travels mostly in air, which has a much lower third-order nonlinearity than does silica (see, e.g., Michel Digonnet, Stephane Blin, Hyang Kyun Kim, Vinayak Dangui, and Gordon Kino, "Sensitivity and stability of an air-core fiber-optic gyroscope," accepted for publication in Measurement Science and Technology, 2007). In certain embodiments, the third-order nonlinearity is reduced in the hollow-core fiber bitaper as compared to conventional bitapers by more than two orders of magnitude. In certain other embodiments having large-core hollow-core fibers, the third-order nonlinearity is reduced by more than four orders of magnitude as compared to conventional bitapers.

Figure 7:
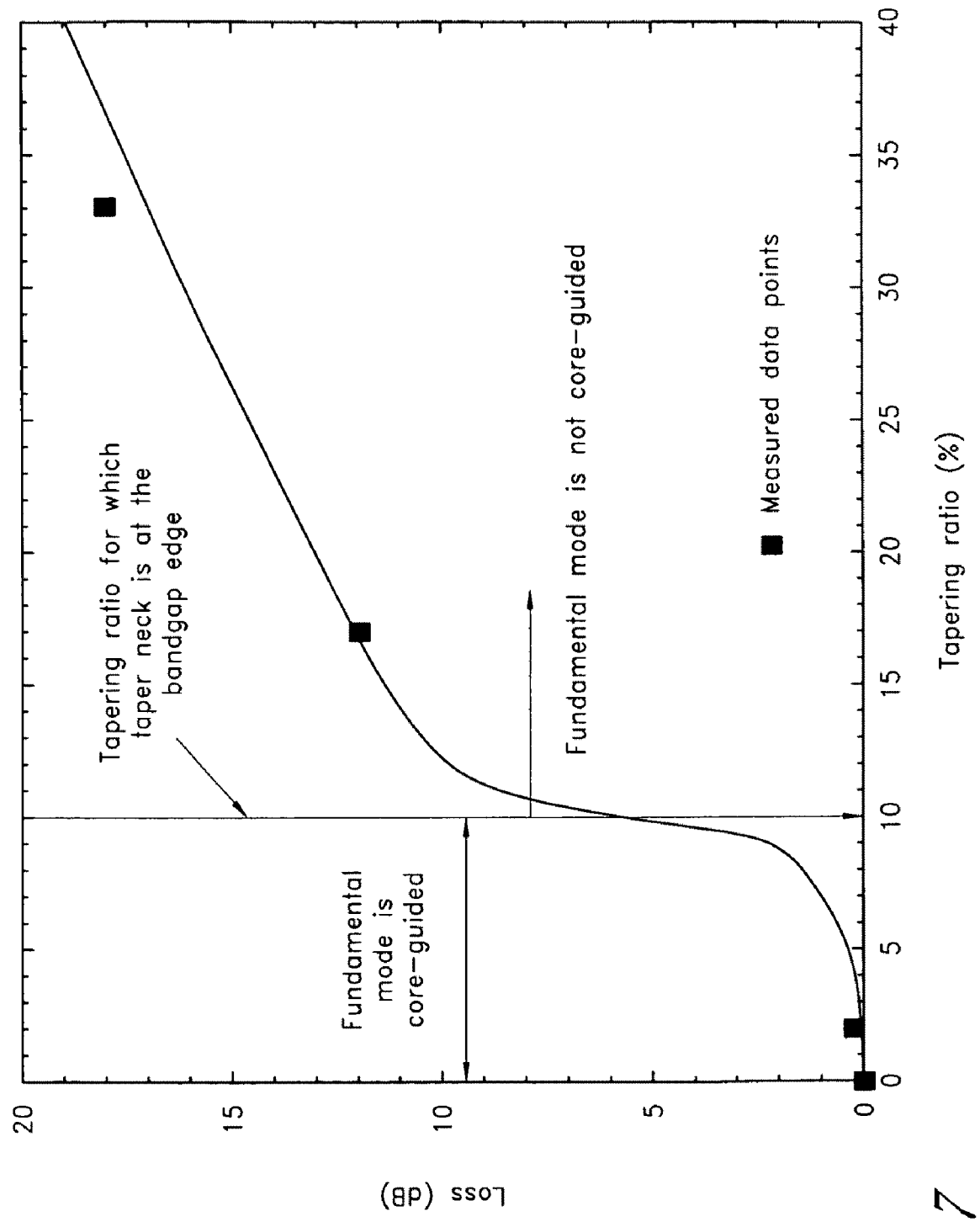
FIG. 7 shows the measured loss of the three air-core fiber tapers compatible with certain embodiments described herein, plotted as a function of their tapering ratio. The solid curve shows the anticipated evolution of the loss with tapering ratio in the vicinity of the critical ratio (about 10% for the Blaze Photonics fiber).

In certain embodiments, the hollow-core fiber bitapers exhibit a fairly high loss, even for low tapering ratios, as shown in FIG. 7. This loss can have at least two contributions in certain embodiments. One contribution in certain embodiments is loss of guidance along a portion of the bitaper. Along the length of a bitaper, all characteristic dimensions of the fiber cross-section are scaled down homogeneously, including the crystal period and the diameters of the core and cladding holes for a PBF. The PBF remains a photonic-bandgap waveguide, but since the wavelengths of the bandgap edges are proportional to the crystal period, from one end of the bitaper to the neck of the bitaper, the bandgap shifts continuously towards shorter wavelengths. For example, in the 17% bitapered PBF, the bandgap shifts from about 1520-1680 nanometers in the unperturbed portion of the hollow-core PBF to about 1260-1395 nanometers at the neck of the hollow-core PBF bitaper. Since there is no overlap between these two wavelength ranges, no wavelength is guided continuously through this hollow-core PBF bitaper. The signals used to probe this bitaper (1530-1575 nanometer) are well guided in the unperturbed region of the hollow-core PBF, but in the vicinity of the neck they fall on the long-wavelength edge of the bandgap and simply diffract throughout the neck region. Past the neck, where the fiber core becomes large enough to support a fundamental mode again, only the portion of the diffracted mode that spatially overlaps with the core mode is captured and guided out to the bitaper output. The critical tapering ratio for which the fundamental mode is no longer guided just at the neck, calculated for the band edges of the Blaze Photonics fiber inferred from its measured transmission spectrum is about 10%. In certain embodiments, the tapering ratio is less than 10%. For certain embodiments in which the bitaper has a tapering ratio larger than this value, along the central part of the bitaper, the fundamental mode does not exist and the signal is not guided. This loss of guidance mechanism discussed above for the 17% bitapered PBF also applies to the 33% bitapered hollow-core PBF, in which there is an even stronger loss of light. However, the loss of guidance does not appreciably contribute to the losses for the <2% bitapered hollow-core PBF. At the neck of the <2% bitapered hollow-core PBF, the bandgap stretches from about 1490 nanometers to 1650 nanometers, so the probe wavelengths used in FIG. 7 are well guided throughout this bitaper.

Another loss mechanism of certain embodiments utilizing a hollow-core PBF is related to the fact that the cladding modes are leaky because the photonic-crystal cladding is surrounded by pure silica (see, e.g., FIG. 2), which has a higher refractive index than the cladding modes. Therefore, the cladding modes to which the core mode is coupled are attenuated, which represents a loss mechanism for the core mode. This loss mechanism does not contribute to loss in a conventional fiber bitaper in air, in which the cladding modes (mostly $HE_{12}$) are strongly guided and suffer very little loss (unless the taper neck is drawn down to a diameter of the order of a wavelength)(see, e.g., D. T. Cassidy, D. C. Johnson, and K. O. Hill, "Wavelength-dependent transmission of monomode optical fiber tapers," Appl. Opt., 1985, Vol. 24, pp. 945-950). On the other hand, this situation is analogous to a conventional fiber bitaper immersed in a medium of index greater than the index of the cladding mode, in which case the cladding mode becomes leaky and the bitaper loss increases. In general, the lower the effective index of the coupled cladding mode, i.e., the shorter the oscillation period in the transmission spectrum, the higher the loss will be. In certain embodiments having a tapering ratio below 10%, the loss is less than about 6 dB. In certain embodiments having a weaker tapering ratio (e.g., less than 2%), the loss is less than 0.3 dB, while still providing oscillations in the transmission spectrum of about 1 dB peak-to-peak. Such fiber tapers can advantageously be used as optical filters. Other fiber tapers in accordance with certain embodiments described herein can also provide sufficiently low losses and oscillations with sufficiently high amplitude variations to be used as optical filters.

These loss mechanisms are consistent with experimental observations. FIG. 7 shows that the measured bitaper loss increases with increasing tapering ratio. The loss increases drastically for a ratio above 2% and below 17%, which is consistent with the critical tapering ratio calculated for this fiber (shown in FIG. 7 as the vertical line at about 10%). The weaker bitaper exhibits only a small loss (less than 0.3 dB), which is consistent with its bandgap edges shifting by a very small amount (less than about 2% of 1600 nanometers, or less than 32 nanometers). In this example bitaper, the fundamental mode remains guided throughout the taper at all the probed wavelengths. In certain embodiments, only a narrow range of wavelengths is coupled into the taper, and a strong taper can be used with the fundamental mode guided through the taper across the narrow range of wavelengths. In certain embodiments, a signal comprising a broad range of wavelengths is coupled into the taper to be filtered. For certain such embodiments (e.g., two signals closely spaced in wavelength, one signal to be filtered out, the other signal transmitted), a relatively strong taper (e.g., approaching 10%) can be used since the fundamental mode will be guided throughout the taper at both wavelengths. For certain embodiments (e.g., two signals spaced in wavelength by a large fraction of the original air-core fiber bandgap), a relatively weak taper (e.g., less than 2%) can be used.

The low loss of the weak bitaper (under about 0.3 dB, see FIG. 7), combined with its short oscillation period, suggest interesting applications, including as a wavelength filter in fiber lasers and other optical systems. Due to the presence of the silica outer cladding surrounding the bitaper's cladding, the transmission spectrum of an air-core fiber bitaper in certain embodiments is at most weakly dependent on the refractive index of the external medium in which it is in contact. It follows that making practical, packaged air-core fiber bitaper devices should be significantly easier than conventional bitapers, which must be suspended in air to avoid inducing loss of index guidance.

Figure 8:
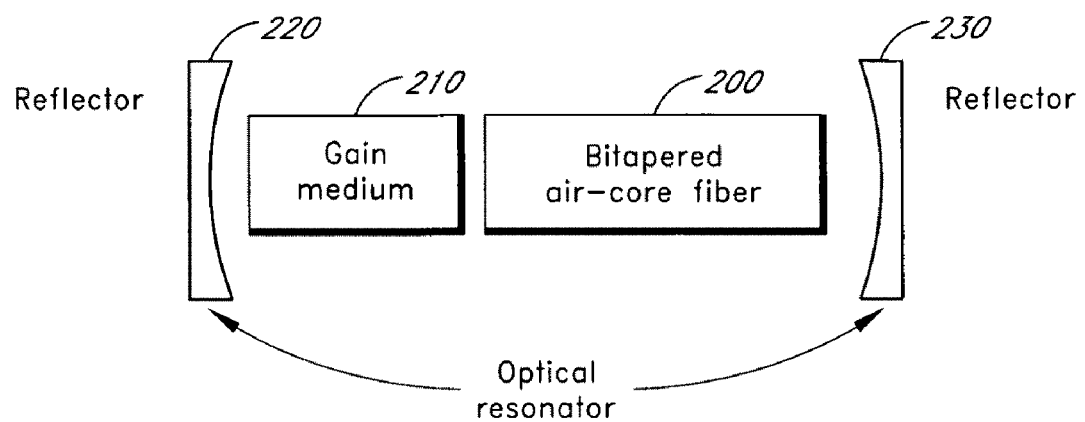
FIG. 8 schematically illustrates an example application of an air-core fiber bitaper as a frequency filter in a laser in accordance with certain embodiments described herein.

FIG. 8 schematically illustrates an example application of an air-core fiber bitaper 200 as a frequency filter in a laser in accordance with certain embodiments described herein. Although this example application is described as a particular example of a Fabry-Perot type of laser cavity, similar descriptions and benefits are also applicable to other types of laser resonators as well (e.g., ring resonators). In FIG. 8, one end of the air-core fiber 200 is connected by conventional means (not shown) to the gain medium 210 (e.g., a bulk gain medium, a waveguide gain medium, or a fiber gain medium). For a bulk gain medium, optical elements such as lenses can be used to couple light from the fiber 200 into the bulk medium 210 and back. The other end of the gain medium 210 is in optical communication with (e.g., optically coupled to) a first optical reflector 220. The laser population in the gain medium 210 is inverted (e.g., by an optical pump or an electrical current) to create gain within the gain medium 210. The other end of the bitapered fiber 200 is in optical communication with a second optical reflector 230. At least one of the first and second reflectors 220, 230 is partially transmitting at the laser wavelengths supported by the gain medium 210 to provide an optical output. The bitapered fiber 200 acts as a frequency filter such that its transmission is high for a frequency that falls on a resonant frequency of the laser cavity located near the center of the gain spectrum. In certain embodiments, the filter forces the laser to oscillate only at that frequency, thus forming a single-frequency laser. In certain other embodiments, a hollow-core bitaper can be utilized as a filter in many other ways (e.g., to reduce the number of modes, to stabilize the output frequency of the laser, or to force oscillation at the fundamental mode spectrum, at a particular frequency, or at a plurality of frequencies).

In certain embodiments, hollow-core bitapered fibers with nominally identical or different transmission spectra can also be concatenated to generate filters with more complex transmission spectra. One example is a spectrum that exhibits a single transmission peak surrounded by high loss over a given range of wavelengths (e.g., 50 nm). Another example is a series of peaks equally or unequally spaced in the frequency domain over a given range of wavelengths.

Figure 9:
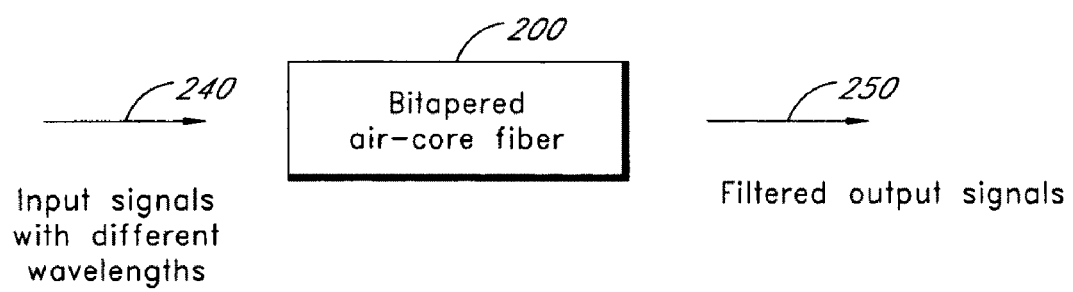
FIG. 9 schematically illustrates another example application of an air-core fiber bitaper as a filter in accordance with certain embodiments described herein.

FIG. 9 schematically illustrates another example application of a hollow-core fiber bitaper 200 as a filter in accordance with certain embodiments described herein. The filter of FIG. 9 serves to attenuate all but one of a multiplicity of signals with different frequencies incident on the filter. In certain embodiments, the input end of the filter is spliced or otherwise placed in optical communication with an input fiber that brings in the input signals 240, and its output end is similarly spliced or otherwise placed in optical communication with an output fiber that carries away the filtered signals 250. The input and/or output signals 240, 250 can also be space-beams coupled in and out of the hollow-core fiber bitaper using conventional means, such as optical lenses. The filter of certain embodiments transmits either only one of the many incident signal wavelengths, or transmit all but one, or any number of wavelengths in between. More generally, certain embodiments described herein transmit any selected wavelengths of the input signals with a transmission between a selected maximum value (e.g., less or equal to 100%) and a selected minimum value (e.g., more or equal to 0). This functionality is useful in certain embodiments for many applications in photonics.

By utilizing one or more hollow-core fiber tapers or bitapers, certain embodiments described herein provide one or more benefits over conventional fiber tapers. In certain embodiments, a hollow-core fiber bitaper with minimal tapering advantageously provides increased mechanical strength compared to bitapers fabricated in conventional all-solid fiber or holey fibers with a solid core, which typically utilize more tapering and are correspondingly more fragile. In certain embodiments, the spectrum of the hollow-core fiber bitaper is generally insensitive to the refractive index of the external medium in contact with the outer portion of the fiber cladding, thereby making packaging of the hollow-core fiber bitaper easier than for conventional bitapers. Certain embodiments which combine the higher mechanical strength with the insensitivity to the external refractive index advantageously provide a greater simplicity for fabrication and packaging of commercial devices utilizing tapered hollow-core fibers. In addition, the mechanical strength of the tapered hollow-core fiber facilitates the use of other mechanical filtering functions with the tapered hollow-core fiber (e.g., a mechanically induced long-period fiber grating (LPFG) on a hollow-core fiber bitaper).

In certain embodiments, a hollow-core fiber bitaper advantageously provides rapid oscillations in the transmission spectrum as a function of wavelength. To produce comparably rapid oscillations using a conventional single-mode fiber (SMF) bitaper, the SMF bitaper would need to be longer and thinner than the hollow-core fiber bitaper. In addition, under similar geometric taper dimensions, a tapered hollow-core fiber would provide more rapid transmission spectra oscillations than would a conventional SMF bitaper.

In certain embodiments, the hollow-core fiber bitapers advantageously exhibit a greatly suppressed third-order nonlinearity, as compared to conventional bitapers. The third-order nonlinearity of the hollow-core fiber bitaper in certain embodiments is reduced as compared to conventional bitapers by more than two orders of magnitude. In certain other embodiments (e.g., large-core hollow-core fibers obtained by removing 19 cells to form the core, instead of the seven in the case of most hollow-core PBFs, as in the case of the fiber shown in FIG. 2), the third-order nonlinearity is reduced by more than four orders of magnitude as compared to conventional bitapers.

In certain embodiments, the hollow core of the tapered fiber is configured to receive a specimen to be analyzed (e.g., comprising one or more chemicals or biological materials). Light is coupled into the tapered fiber, and the light spectrum is selected such that at least a portion of the light spectrum overlaps with the absorption spectrum of the specimen. At the output of the tapered fiber, a detector measures the power of the light transmitted by the tapered fiber, and/or a spectrophotometer measures the spectrum of the light transmitted by the tapered fiber. The output signal from the optical detector can be inputted into a computer or other electronic device to analyze the signal and to record, store, and/or display information regarding the specimen. Because the measured transmitted power and/or the transmission spectrum of the taper are sensitive to the presence of particular molecules or molecular species bound to the inner surface of the core, certain such embodiments can advantageously be utilized as chemical or biological sensors. In certain embodiments, the transmission spectrum is also indicative of the amount or concentration of the particular molecules or molecular species. In certain such embodiments, the inner surface of the hollow core can be activated to bind to one or more particular molecules or molecular species. Such activation of the inner surface has previously been shown for untapered hollow-core fibers. The oscillations in the transmission spectrum of the tapered hollow-core fiber in certain embodiments are modified upon bonding of a reagent to the inner surface of the tapered hollow core. Because a large portion of the light transmitted by the tapered hollow-core fiber is within the core, the response of the transmission spectrum of a tapered hollow-core fiber can be quite sensitive to the presence of the reagent, even with a relatively weak taper. In contrast, for a conventional SMF taper, the species to be detected can only be attached to an outside surface of the fiber. To obtain a good spatial overlap between the light traveling through the SMF taper and the species to be detected, the conventional SMF taper needs to be rather strong (typically of the order of a few wavelengths in diameter at the neck of the bitaper), resulting in a very thin and mechanically fragile device. However, even in this configuration, the spatial overlap between the light mode and the species in a conventional SMF taper is significantly weaker than for a tapered hollow-core fiber. One advantage of performing sensing utilizing a tapered hollow-core fiber as opposed to an untapered hollow-core fiber is that with the tapered hollow-core fiber, the presence of the species to be detected affects the fine structure (e.g., the period of the oscillations and the positions of the transmission peaks or troughs in the frequency domain) of the transmission spectrum. In contrast, for an untapered hollow-core fiber, the same species would induce only and/or mostly an overall change in the magnitude of the transmission spectrum. Using a tapered hollow-core fiber is therefore a more sensitive technique for measuring species, especially for detecting the presence of traces of chemical or biological species at concentrations that may not otherwise be detected using untapered hollow-core fibers.

Various embodiments of the present invention have been described above. Although this invention has been described with reference to these specific embodiments, the descriptions are intended to be illustrative of the invention and are not intended to be limiting. Various modifications and applications may occur to those skilled in the art without departing from the true spirit and scope of the invention as defined in the appended claims.

What is claimed is:

1. An optical device comprising an optical fiber, the optical fiber comprising a first optical fiber portion comprising a first hollow core having a first diameter, the optical fiber further comprising a second optical fiber portion comprising a second hollow core having a second diameter smaller than the first diameter, wherein the difference between the first diameter and the second diameter is less than 10% of the first diameter.

2. The optical device of claim 1, wherein the first optical fiber portion comprises a first photonic-crystal cladding having a third diameter, and the second optical fiber portion comprises a second photonic-crystal cladding having a fourth diameter smaller than the third diameter.

3. The optical device of claim 1, wherein the difference between the first diameter and the second diameter is less than 2% of the first diameter.

4. The optical device of claim 1, wherein the optical fiber has a tapering ratio of less than 2%.

5. The optical device of claim 1, wherein the optical fiber has a tapering ratio of less than 10%.

6. The optical device of claim 1, wherein the optical fiber further comprises a tapered optical fiber portion between the first optical fiber portion and the second optical fiber portion, the tapered optical fiber portion comprising a third hollow core with a monotonically-varying diameter.

7. The optical device of claim 1, wherein the optical fiber further comprises a third optical fiber portion having a third hollow core having a fifth diameter larger than the second diameter, the second optical fiber portion between the first optical fiber portion and the third optical fiber portion.

8. The optical device of claim 7, wherein the fifth diameter is substantially equal to the first diameter.

9. The optical device of claim 7, wherein the optical fiber further comprises a tapered optical fiber portion between the second optical fiber portion and the third optical fiber portion, the tapered optical fiber portion comprising a fourth hollow core having a monotonically-varying diameter.

10. The optical device of claim 1, wherein the optical device comprises an optical filter having a transmission spectrum in a selected range of wavelengths, the transmission spectrum having modulations with a modulation period in a range between about 0.5 and about 3.3 nanometers.

11. The optical device of claim 1, where both the first optical fiber portion and the second optical fiber portion are transmissive to light having a first range of wavelengths, and the first optical fiber portion is transmissive to light having a second range of wavelengths, wherein the second optical fiber portion is not transmissive to the light having the second range of wavelengths.

12. The optical device of claim 1, wherein the second hollow core of the second portion is configured to receive a specimen, the specimen comprising one or more chemicals or biological materials, wherein a transmission spectrum of the optical device is indicative of the presence of a predetermined molecule or molecular species in the specimen.

13. A method of forming an optical fiber, the method comprising:
providing a hollow-core fiber, the hollow-core fiber comprising a first portion, a second portion, and a third portion positioned between the first portion and the second portion, the third portion having a first diameter;
heating at least the third portion of the hollow-core fiber to a temperature at which the third portion is plastically deformable;
pulling at least one of the first portion and the second portion such that a distance between the first portion and the second portion increases, thereby stretching and plastically deforming the third portion such that the third portion has a second diameter less than the first diameter, wherein pulling is stopped before the difference between the second diameter and the first diameter is greater than 10% of the first diameter; and
allowing the hollow-core fiber to cool and set.

14. A method of filtering an optical signal, the method comprising:
providing an optical fiber comprising:
a first portion comprising a first hollow core having a first diameter; and
a second portion comprising a second hollow core having a second diameter smaller than the first diameter, wherein the difference between the first diameter and the second diameter is less than 10% of the first diameter; and
transmitting an optical signal through the first portion of the optical fiber to the second portion of the optical fiber, wherein a first portion of the optical signal having a first range of wavelengths is transmitted through the second portion of the optical fiber and a second portion of the optical signal having a second range of wavelengths is not transmitted through the second portion of the optical fiber.

15. The method of claim 14, wherein the optical fiber further comprises a third portion having a third hollow core having a third diameter larger than the second diameter, and the method further comprises transmitting a portion of the second portion of the optical signal through the third portion of the optical fiber, wherein the portion of the second portion of the optical signal has a third range of wavelengths.

16. A laser system comprising:
a hollow-core fiber comprising:
a first optical fiber portion comprising a first hollow core having a first diameter;
a second optical fiber portion comprising a second hollow core having a second diameter smaller than the first diameter; and a third optical fiber portion having a third hollow core having a third diameter larger than the second diameter;

two optical reflectors bounding an optical resonating region, wherein the second optical fiber portion is within the optical resonating region; and a gain medium in the optical resonating region, wherein the hollow-core fiber is in optical communication with the gain medium.

17. The laser system of claim 16, wherein the difference between the first diameter and the second diameter is less than 10% of the first diameter.

18. A method of generating laser light, the method comprising:

providing a hollow-core fiber comprising:

a first optical fiber portion comprising a first hollow core having a first diameter;

a second optical fiber portion comprising a second hollow core having a second diameter smaller than the first diameter, the second optical fiber portion in an optical resonating region having a fundamental mode spectrum; and a third optical fiber portion having a third hollow core having a third diameter larger than the second diameter;

providing a gain medium in the optical resonating region, the gain medium in optical communication with the hollow-core fiber; and using the hollow-core fiber to filter light from the gain medium by removing light having one or more wavelengths different from the fundamental mode spectrum.

19. The method of claim 18, wherein the difference between the first diameter and the second diameter is less than 10% of the first diameter.

20. A method of sensing the presence of one or more chemicals or biological materials in a specimen, the method comprising:

providing a hollow-core fiber comprising:

a first portion comprising a first hollow core having a first diameter;

a second portion comprising a second hollow core having a second diameter smaller than the first diameter, wherein the difference between the first diameter and the second diameter is less than 10% of the first diameter; and a third portion having a third hollow core having a third diameter larger than the second diameter;

inserting the specimen into the hollow-core fiber; and detecting a transmission spectrum of the hollow-core fiber while the specimen is within the hollow-core fiber, wherein the transmission spectrum is indicative of the presence of a predetermined molecule or molecular species in the specimen.

* * * * *